April 23, 1946. J. A. PELLETTERE 2,398,958
LEVEL INDICATOR FOR STORAGE BINS OR HOPPERS
Filed Dec. 14, 1944 2 Sheets-Sheet 1

Inventors
JOSEPH A. PELLETTERE
By G. M. Houghton
his Attorney

Inventor
JOSEPH A. PELLETTERE

Patented Apr. 23, 1946

2,398,958

UNITED STATES PATENT OFFICE 2,398,958

LEVEL INDICATOR FOR STORAGE BINS OR HOPPERS

Joseph A. Pellettere, Pittsburgh, Pa., assignor to Gulf Oil Corporation, Pittsburgh, Pa., a corporation of Pennsylvania Application December 14, 1944, Serial No. 568,124

6 Claims. (Cl. 33—126)

This invention relates to level indicators for storage bins or hoppers and the like and particularly to devices for continuously measuring or indicating the level of powdered or granular material in such containers.

In many industries, stores of powdered or granular material are maintained in huge hoppers or bins from which the material is withdrawn for use as needed. To supplement for the material withdrawn, fresh material is from time to time added to the bin and because of these withdrawals and additions the quantity of material in the bin at any particular time is not always known nor is it easy to determine exactly the level of the material in the bin. Often, the bin or hopper itself is actually a part of apparatus used for carrying out a particular process and is maintained under pressure and temperature above atmosphere. In such cases, the bins or hoppers are usually smaller than storage containers and close track must be kept of the quantity of material in the hopper because of the disastrous results which might follow should the hopper become empty.

Heretofore gages or level indicators for accomplishing the above have taken the form of highly complicated mechanisms involving numerous moving parts that require careful adjustment and attention and are subject to considerable wear. Briefly one such arrangement includes mechanical, electrical and pneumatic mechanisms. A vertically reciprocating weighted arm is periodically raised and lowered in the bin through a packing gland located in the top of the bin. This is accomplished through the use of a continuously running electric motor and a gear train located high in the air over the bin. A special timing device employing electrical contacts sends a direct current from a D. C. rectifier to an electromagnetic clutch to cause the motor shaft to engage and actuate the arm. The arm, after being raised a definite distance, say six inches, is then released and is allowed to fall by gravity onto the surface of the material in the bin. In falling the arm operates an air mechanism which transmits, according to the position of a cam, a pneumatic impulse that, as a pressure reading indicates spasmodically the level of clay in the bin. Such apparatus is exceedingly complicated, difficult to adjust and maintain in adjustment and subject to considerable wear and attention because of the large number of moving parts involved.

An object of the present invention is the provision of a simple all pneumatic level indicator composed of a few number of parts and which is free of gear trains and electrical contrivances.

A further object of the invention is the provision of such a gage which may be operated at elevated temperatures and pressures and which is adapted to indicate the level of the material in a bin at a point or points remote from the bin.

A further object of the invention is the provision of a level indicator for powdered or granular material which will give a continuous rather than spasmodic indication of the level of the material.

A still further object of the present invention is the provision of a level indicator of the type described which shall be fully automatic, inexpensive to build and operate, and accurate and reliable in use.

In accordance with the above objects, the present invention includes a pneumatically raised and lowered vertical rod or tube in the bin, the movement of which is "sensitized" or controlled by the rise and fall in pressure of a jet of gas discharged from the lower end of the tube against the surface of the material in the bin. For instance, should the material in the bin recede from the end of the tube thus lowering the back pressure of gas in the tube below a predetermined fixed or normal pressure, suitable mechanism is automatically actuated to lower the tube until its nozzle again proximates the surface of the material in the bin. At this time the close proximity of the material to the nozzle again builds up the pressure of gas in the tube to the desired value and further downward movement of the tube is automatically stopped. On the other hand, should material be added to material already in the bin, the level of the material in the bin will rise into even closer proximity to the nozzle, perhaps even temporarily covering or submerging the same a short distance. This causes an increase in back pressure on the gas in the tube above normal and results in automatic actuation of a valve controlling pneumatic lifting mechanism which raises the tube until the back pressure in the tube drops to the point where the nozzle is once more slightly above the surface of the material. The action of the air jet, valves and lifting and lowering mechanism is, in effect to cause the tube to "feel" for and seek the surface of the material in the bin. Movement of the tube in one direction is opposed by a spring and the pneumatic pressure required by the raising or lowering mechanism to balance the load on the spring in any position of the tube, is registered by a pressure gage and is an indication of the level of the material in the bin.

In cases where the pressure of air will not affect the material in the hopper, air may be conveniently used in the tube in the hopper. Sometimes however the use of air may be detrimental to the material in the hopper as, for instance, when the material is a catalyst used in a process of making gasoline. In this case a gas inert with respect to the material in the bin is best used.

For a further understanding of the invention, reference is made to the following detail description of a preferred embodiment thereof and to the accompanying drawings in which, Fig. 1 is a diagrammatic view partly in elevation showing the level indicator of the present invention applied to a hopper.

Figs. 3 and 4 are fragmentary, detail sectional views of two different forms of feeler tube discharge nozzles.

Figure 1:
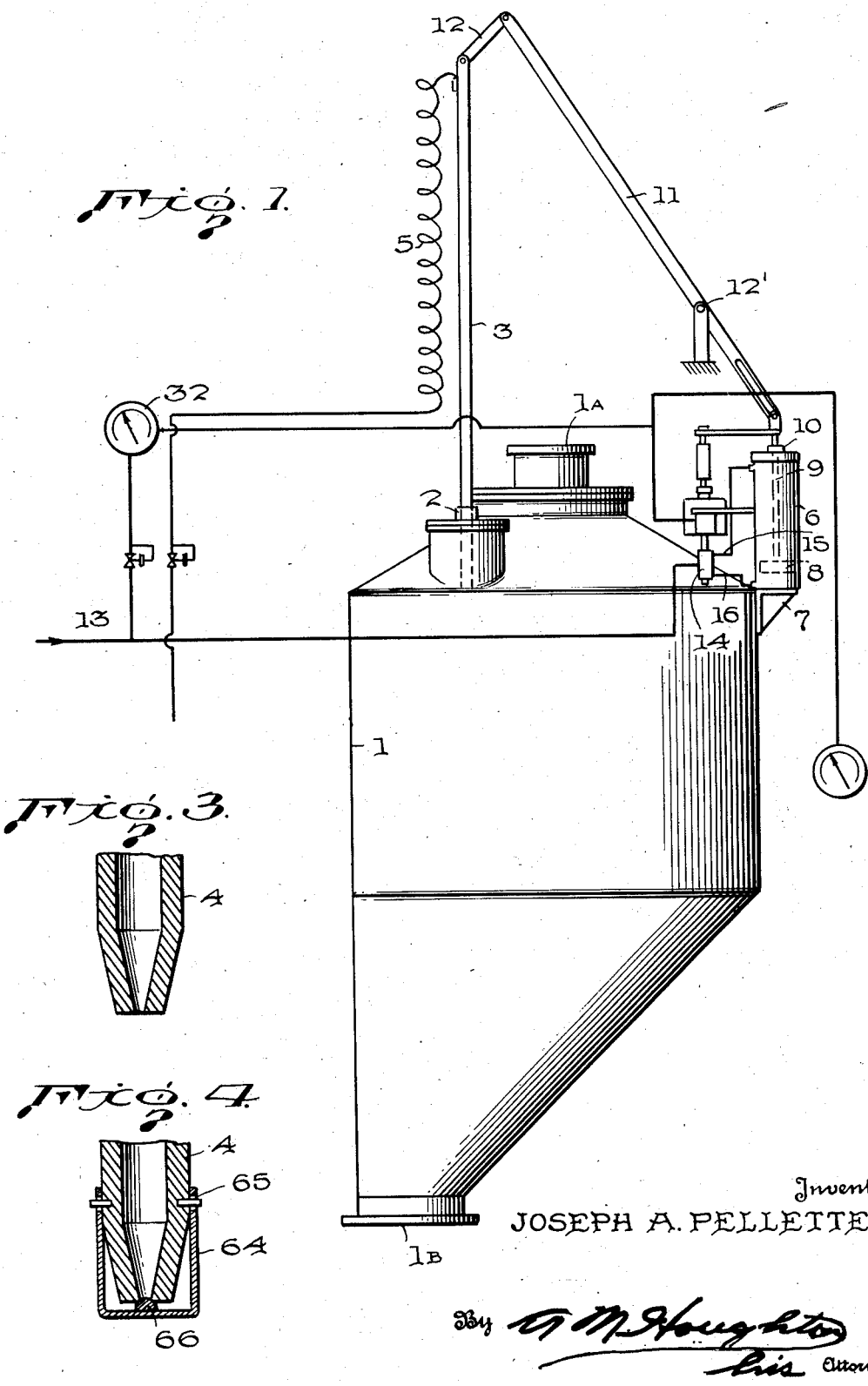

Referring to the drawings wherein like numerals designate corresponding parts throughout the several views, 1 is a hopper of conventional design of metal, wood or any convenient substitute, adapted to contain a body of powdered or granular material. Material is introduced into the hopper at a point adjacent its top, for instance through manhole 1A, and withdrawn therefrom through the spout shaped lower end 1B of the hopper by means of conventional apparatus not shown. Extending into the hopper through a packing gland 2 in its top is a tube 3 hereinafter referred to as a "feeler" tube.

Tube 3 is adapted to be raised and lowered in the hopper and is open at its lower end to provide a discharge orifice or nozzle 4 through which gas supplied to the tube through flexible conduit or hose 5 is continuously discharged. In use the feeler tube is adapted to be lowered until its nozzle lies close to the surface of the material in the hopper. In this position a certain back pressure will be exerted upon the gas in the tube due to the resistance offered to the escape of gas from the nozzle by the presence of the material in the hopper adjacent the nozzle, and also it is apparent this pressure will vary in accordance with whether the material in the hopper rises above the end of nozzle 1 thereby increasing the back pressure, or drops below the end of the nozzle thereby lowering the back pressure.

In accordance with the present invention means are provided for amplifying and utilizing changes in the pressure of the gas in the feeler tube to control the operation of pneumatic apparatus for raising and lowering the tube to maintain its discharge nozzle at a certain spaced but short distance above the level of the material in the hopper. This is accomplished by the provision of a power cylinder 6 secured to the hopper adjacent its top by a bracket 7. The power cylinder is provided with a piston 8 and piston rod 9 which rod extends through a packing gland 10 at one end of the cylinder and is pivotally connected to the short arm of a lever 11 as by pin and slot connection or suitable linkage permitting rectilinear movement of the piston rod. Lever 11 has a fixed pivot 12' positioned so that the long arm of the lever will travel a distance equal to the desired vertical travel of the feeler tube in the hopper when the piston in the power cylinder moves from one end of the cylinder to the other. The long arm of lever 11 is connected to the top end of the feeler tube through a suitable linkage 12 which provides for substantially straight line motion of the feeler tube.

Figure 5:
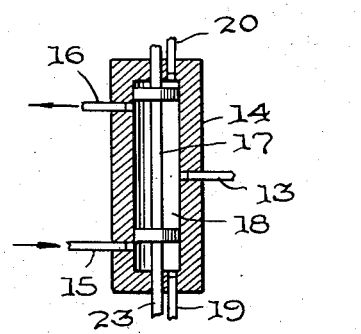
Figs. 5 and 6 are detail sectional views of the pilot valve for pneumatically controlling the feeler tube lifting mechanism and show the valve in two of its operating positions.
Figure 6:
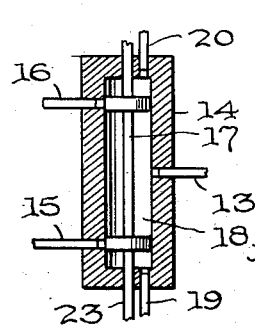

Gas under pressure is supplied to the power cylinder from a suitable source through pipe 13, pilot valve 14 and tubes 15 and 16, the latter two tubes leading respectively to opposite ends of the power cylinder as shown. Pilot valve 14, illustrated in detail in Figs. 5 and 6, consists of a cylinder provided with a double headed piston 17, the space between the pistons forming with the walls of the cylinder a sliding valve chamber 18. The cylinder is provided with ports for communication with pipes 13, 15 and 16 as shown, and with ports 19 and 20 at each end of the cylinder, which latter ports are continuously open to the atmosphere. In the fully raised position of the valve shown in Fig. 5, gas under pressure entering through tube 13, is discharged through tube 16 to the top end of the power cylinder, while gas in the lower end of the power cylinder is exhausted through pipe 15 and pilot valve port 19 to the atmosphere. In the extreme lower position of the valve (not shown) pressure gas entering the valve through tube 13 is discharged through tube 15 to the lower end of the power cylinder, while gas in the upper end of the power cylinder is exhausted to the atmosphere through port 20. Fig. 6 shows the pilot valve in midposition in which gaseous flow through tubes 15 and 16 is entirely cut off.

Operation of the pilot valve is controlled by means of a power control bellows 21, the movable stem 22 of which is directly connected to piston rod 23 of the pilot valve. Also connected to stem 22 and adapted to move therewith is a tie plate 24 to which is secured a yoke shaped member 25. Attached to the yoke at one end, as shown, is a bellows loading spring 26, the other end of which is secured to piston rod 9 of the power cylinder 6 by a bracket 27. The initial tension applied to spring 26 is adjustable by means of bolt 28 and nuts 29 connecting the end of the spring to the bracket.

Figure 2:
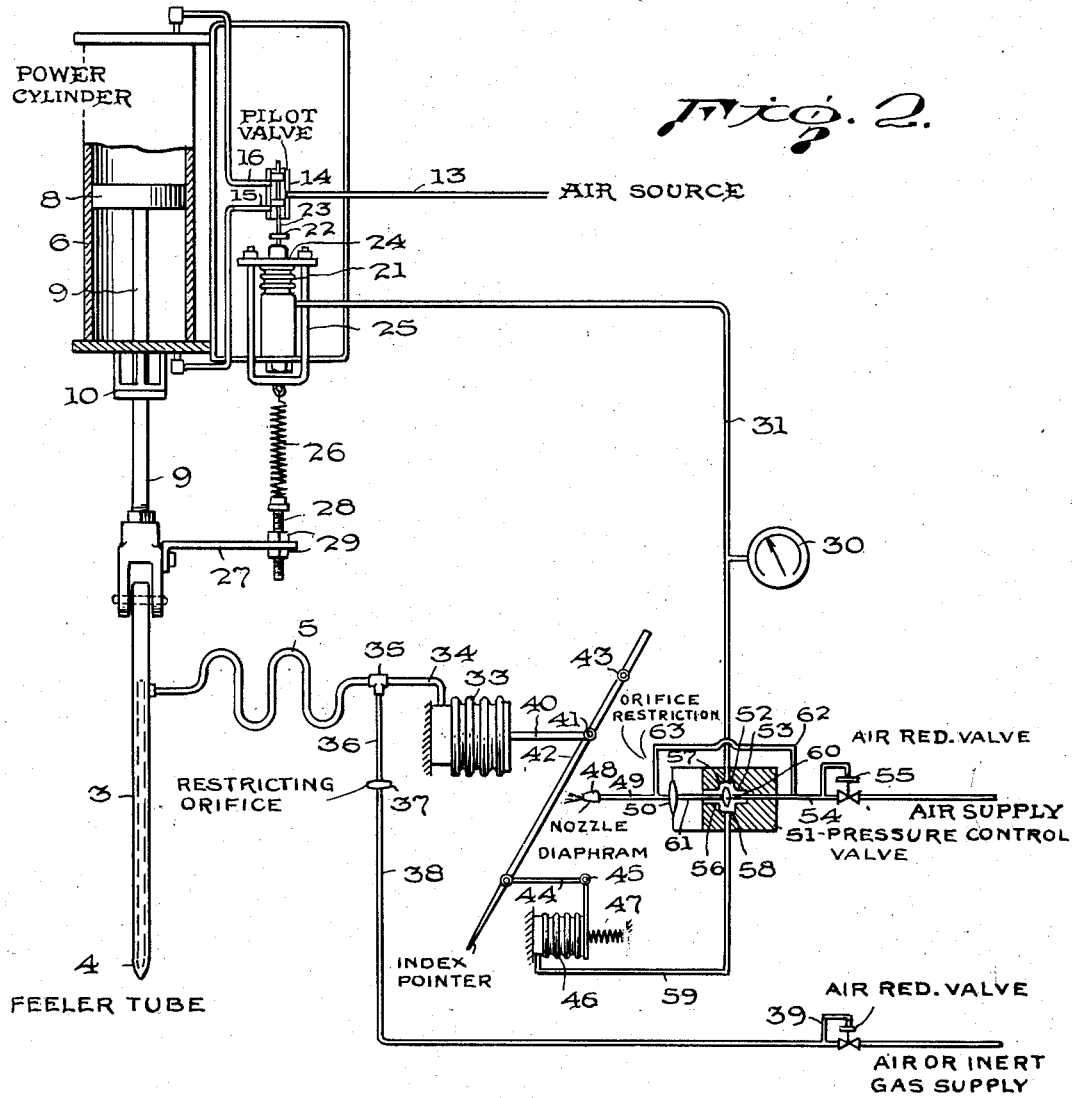
Fig. 2 is a diagrammatic view partly in section of the feeler tube and the pneumatic mechanism for operating the tube.

Referring to Fig. 2, it will be seen that as so far described, when feeler tube 3 is lowered bellows spring 26 is stretched i. e. its load is increased and simultaneously the gas in bellows 21 is compressed by contraction of the bellows. As will be more fully described hereinafter there is thus created a definite pressure in bellows 21 which is directly proportional to the vertical displacement of the feeler tube and this pressure, as it affects gage 30 in gas pressure line 31 leading to the bellows indicates directly the level of the material in the hopper.

The admission and discharge of pressure gas to the control bellows is by means of a pressure controller indicated generally in Fig. 1 by the numeral 32. Shown diagrammatically in detail in Fig. 2, this consists of a primary bellows element 33 connected by means of pipe 34 to a T pipe connection 35. One side of the T is connected to the end of the flexible pipe leading to the feeler tube while the other side of the T connects with a source of pressure gas supply through pipe 36, orifice 37, pipe 38 and air reducing valve 39. Orifice 37 is somewhat smaller than the orifice in nozzle 4 of the feeler tube so that there will occur a substantial drop in pressure of the gas in the feeler tube and in bellows 33 when discharge of gas from the feeler tube is unrestricted by the presence of granular material in the hopper. Stem 40 of bellows 33 is pivotally connected as at 41 to an arm 42 which in turn is fixedly pivoted as at 43 to the frame (not shown) of the pressure controller. Arm 42 may be the index pointer of a gage as indicated at 32.

Also pivotally connected to arm 42 but spaced a greater distance from fixed pivot 42 than pivot 41 is a rod 44, the other end of which is rigidly connected as at 45 to a second bellows 46. Counterbalancing the movements of bellows 46 is a coil spring 47, the arrangement of bellows 46 and spring 47 serving to stabilize the movements of arm 42. Arm 42 is provided with a vane (not shown) adapted in different positions of arm 42 to obstruct in different degree the discharge of gas from a nozzle 48 of the pressure controller. Nozzle 48 is connected by means of a tube 49 to the bellows diaphragm 50 of a pressure control valve 51. As shown valve 51 is provided with two pairs of diametrically opposed ports entering a common valve chamber 52. Port 53 connects through a pipe 54 and a pressure reducing valve 55 with a supply of air under pressure. Port 56 which is diametrically opposed to port 53 opens to the atmosphere. Port 57 connects with pipe 31 leading to the power control bellows while port 58 connects with bellows 46 through pipe 59. Located in valve chamber 52, to alternately open and close ports 53 and 56 is a valve 60, the valve stem 61 of which contacts diaphragm 50 for movement of the valve. As shown, air pressure supply pipe 54 is provided with a bypass 62 around the valve between the reducing valve 55 and the nozzle 48 for supplying air to the nozzle. An orifice restriction in the bypass, in the region of reference numeral 63 but not specifically shown, causes a desired drop in pressure in the diaphragm 50 when flow through nozzle 48 is unrestricted.

Considering the apparatus as described to be mounted in position on a bin or hopper as shown in Fig. 1, and the hopper to be about half full of powdered or granular material, feeler tube 3 will occupy a position with its nozzle 4 closely adjacent the surface of material in the hopper. In this position, inert gas escaping from nozzle 4 will be under a definite back pressure in tube 3 and bellows 33, and the vane on pointer 42 will partially restrict the discharge of air from nozzle 48. This will build up a definite back pressure of air in diaphragm bellows 50 which in a partially expanded position will maintain valve 60 slightly off valve port or seat 56. In this position valve 60 will maintain an air pressure in power control bellows 21 just sufficient to balance the load on spring 26 and to maintain pilot valve 14 in the position shown in Fig. 6, i. e., with pistons 17 closing ports 15 and 16. The position thus occupied by feeler tube will be indicated by pressure gage 30.

Then, supposing the level of the material in the bin to drop due to withdrawal of material from the bin, there will be a sudden drop in pressure of the inert gas in the feeler tube and in bellows 33. This will cause bellows 33 to contract and move arm 42 and the vane carried thereby away from nozzle 48. The drop in pressure thus occasioned in diaphragm 50, because of the unrestricted flow of air through nozzle 48 will contract bellows 50 and move valve 60 to close port 56. Air pressure will then build up in tube 31 and control bellows 21 to expand the bellows and move pilot valve 14 into the position shown in Fig. 5. In this position the pilot valve will deliver air under pressure to power cylinder 6 through tube 16 and cause the piston in the power cylinder to move the feeler tube downwardly in the hopper. Exhaust air from the opposite side of the piston in the power cylinder will pass through tube 15 to the atmosphere through port 19 of the pilot valve.

Immediately nozzle 4 comes again into close contact with the new level of the material in the hopper, the pressure of the inert gas in the feeler tube and in bellows will increase and valve 60 will be positioned substantially as before but slightly more closed to maintain a higher pressure in tube 31 and power control bellows 21 to overcome the new load on stretched bellows loading spring 26. This new load, or pressure will actuate gage 30 to give a new reading of the position of feeler tube 3 in the bin and show that the level of the material in the bin is so many feet or inches lower than before. Should material be added to the bin, the apparatus will act substantially in the reverse.

With the feeler tube nozzle shown in Fig. 3, it may sometimes happen that the tube will tend to bury itself a distance in the material in the hopper due to the jet of gas issuing from the nozzle blowing material away from beneath the end of the tube to form a cavity. Whether or not this will occur depends also on the type of material in the bin and on the pressure of the gas issuing from the nozzle. However it may, in some cases, be disadvantageous to have the tube bury itself, even a short distance, in that a true reading of the level of the material in the hopper will not be had.

This may be avoided by the use of the feeler tube nozzle shown in Fig. 4. In Fig. 4 the nozzle is provided with a baffle 64 which is slip-joined to the nozzle by means of a pair of strap members as shown at 65. Baffle 64 has a nozzle closure member or seat 66 arranged to register with the opening in the nozzle and escape of gas is across the face of the baffle. With this arrangement gas issuing from the feeler tube spends its force against the baffle and not the material in the bin and the feeler tube and baffle will stay in contact with the top surface of the material in the bin.

The level indicator disclosed is adapted for use with bins or hoppers operated under pressure and at elevated temperatures. When operated with bins under pressure however, the pressure of the gas in the feeler tube is greater than the pressure of the gas in the bin. It is simple in construction and reliable in operation and will give a continuous reading of the level of the material being measured. Being composed of a few number of moving parts, it is substantially free from the usual wear occasioned by the character of the material in the hopper.

What I claim is:

1. Apparatus for continuously indicating the level of powdered or granular material in a container, comprising a member in the container, means for establishing a pneumatic differential pressure between the member and the top surface of the material in the container, means for moving the member, means actuated by changes in differential pressure between the member and the material and occasioned by the rise and fall in level of the material relative to the member for controlling the means for moving the member, whereby the member is moved in direction and degree to maintain said differential pressure substantially constant, and means actuated by the member in proportion to its degree of vertical displacement in the container for indicating the level of the material in the container.

2. In apparatus for continuously indicating the level of powdered or granular material in a container the improvement which comprises, a member in the container, means for establishing a pneumatic pressure between the top surface of the material in the container and said member, said pressure being greater than the average pneumatic pressure in said container and means actuated by fluctuations in the pneumatic pressure between the member and the material for moving the member in direction and degree to maintain said pressure substantially constant.

3. Apparatus for continuously indicating the level of powdered or granular material in a container, comprising a member in said container, means for establishing a pneumatic differential pressure between the member and the top surface of the material in the container, means for moving said member, means actuated by the changes in the differential pressure between said member and said material occasioned by the rise and fall of the material with respect to the member for controlling the member moving means, whereby the member is moved in direction and degree to maintain said differential pressure substantially constant, means for establishing a pneumatic pressure proportional to the degree of vertical displacement of said member in the container and means responsive to said last named pneumatic pressure means for indicating the level of the material in the container.

4. Apparatus for determining the level of granular material in a bin comprising a source of gas under pressure, a tube arranged for substantially vertical reciprocation in the bin, communicating means including an orifice restriction for delivering gas under pressure from said source to the tube, a gaseous discharge nozzle on the lower end of the tube adapted to lie in close proximity to the top surface of the material in the bin whereby a normal back pressure is maintained on the gas in the tube due to the restriction to flow offered by the close proximity of the material in the bin to the nozzle and whereby said back pressure is increased or decreased in accordance with the change in level of the material in the bin relative to the nozzle, pneumatic means for controlling the raising and lowering of the tube and nozzle in the bin, spring means for loading said pneumatic means in accordance with the depth to which the tube is lowered in the bin, means adapted for actuation by the pressure of the gas in the tube above and below the normal back pressure, for increasing or decreasing the pressure of the gas in said pneumatic means, and a pressure gage connected to said pneumatic means for indicating the pressure of the gas therein, the reading of said pressure gage being directly proportional to the level of the material in the bin immediately adjacent the end of the nozzle.

5. In apparatus for determining the level of granular material in a bin, a tube arranged for substantially vertical reciprocation in the bin, a nozzle on the lower end of the tube in close proximity to the surface of the material in the bin and arranged to discharge gas under pressure against the top surface of the material in the bin whereby a normal back pressure is produced on the gas in said tube due to the resistance to flow offered by the close proximity of the material in the bin to the end of the nozzle, a source of gas under pressure, communicating means including an orifice restriction of higher resistance to the flow of gas than the nozzle for delivering gas under pressure to the nozzle whereby a substantial drop in gaseous pressure is produced in the tube when flow through the nozzle is unrestricted by the presence of the material in the bin and a substantial increase in back pressure is produced in the tube when the surface of the material in the bin rises relative to the nozzle to increase the resistance to the discharge of gas through the nozzle, and means adapted for actuation by the change in pressure in the tube for vertically moving the tube into proximity with the top surface of the material in the bin to maintain said normal back pressure of gas in the tube.

6. The subject matter of claim 2 wherein said nozzle is provided with a baffle adapted to rest on the top surface of the material in the bin and a slip joint connecting the baffle to the nozzle whereby gaseous discharge through the nozzle is variously restricted depending upon the position of the nozzle with respect to the baffle.

JOSEPH A. PELLETTERE.